US008128329B2

(12) United States Patent
Pilon

(10) Patent No.: US 8,128,329 B2
(45) Date of Patent: Mar. 6, 2012

(54) WALL ANCHOR

(76) Inventor: Jean Pilon, Ste-Anne-des-Plaines (CA)

( * ) Notice: Subject to any disclaimer, the term of this patent is extended or adjusted under 35 U.S.C. 154(b) by 511 days.

(21) Appl. No.: 12/314,936

(22) Filed: Dec. 19, 2008

(65) Prior Publication Data

US 2009/0169331 A1   Jul. 2, 2009

(30) Foreign Application Priority Data

Dec. 31, 2007   (GB) .................................... 0725363.6

(51) Int. Cl.
*F16B 13/10*   (2006.01)
(52) U.S. Cl. ............................ 411/346; 411/344; 411/38
(58) Field of Classification Search .................. 411/340, 411/344–346, 34, 38
See application file for complete search history.

(56) References Cited

U.S. PATENT DOCUMENTS

| 2,024,871 A | 12/1935 | Parsons |
| 2,396,501 A * | 3/1946 | Gibson .......................... 411/38 |
| 2,398,220 A | 4/1946 | Gelpcke |
| 2,567,372 A | 9/1951 | Gelpcke |
| 2,610,013 A * | 9/1952 | Gibson .................... 248/231.91 |
| 3,241,420 A | 3/1966 | Passer |
| 3,288,014 A * | 11/1966 | Aackersberg ................ 411/344 |
| 3,302,508 A | 2/1967 | Topf |
| 3,389,631 A | 6/1968 | Vaillancourt |
| 3,513,746 A | 5/1970 | Forsberg |
| 3,888,156 A * | 6/1975 | Fima ............................... 411/38 |
| 4,079,655 A | 3/1978 | Roberson, Jr. |
| 4,116,104 A | 9/1978 | Kennedy |
| 4,283,986 A | 8/1981 | Peterson et al. |
| 4,285,264 A | 8/1981 | Einhorn |
| 4,286,497 A | 9/1981 | Shamah |
| 4,353,673 A * | 10/1982 | Lesowsky ....................... 411/38 |
| 4,502,826 A * | 3/1985 | Fafard ........................... 411/340 |
| 4,616,968 A | 10/1986 | Giannuzzi |
| 4,732,520 A | 3/1988 | Giannuzzi |
| 4,764,065 A | 8/1988 | Johnson |
| 4,810,146 A | 3/1989 | Sinclair |
| 4,822,226 A | 4/1989 | Kennedy |
| 4,997,327 A | 3/1991 | Cira |
| 5,067,864 A | 11/1991 | Dewey et al. |
| 5,147,166 A | 9/1992 | Harker |
| 5,226,768 A | 7/1993 | Speer |
| RE35,358 E | 10/1996 | Belser |
| 5,690,454 A * | 11/1997 | Smith .............................. 411/30 |
| 5,702,218 A | 12/1997 | Onofrio |
| 5,876,169 A | 3/1999 | Wrigley |
| 6,023,901 A | 2/2000 | Jensen |

(Continued)

*Primary Examiner* — Flemming Saether

(57) ABSTRACT

A wall anchor attachable to a wall, the wall defining a wall aperture. The wall anchor includes a body; a retention element operatively coupled to the body so as to be reversibly movable between a retracted configuration and an expanded configuration, wherein, when the retention element is in the retracted configuration, the wall anchor is insertable into and removable from the wall aperture, and, when the retention element is in the expanded configuration and the body is operationally extending through the wall aperture, the retention element cooperates with the body to attach the wall anchor to the wall; and an actuator operatively coupled to the retention element for selectively moving the retention element between the expanded and retracted configurations. Inserting the wall anchor through the wall aperture with the retention element in the retracted configuration and subsequently using the actuator to move the retention element to the expanded configuration attaches the wall anchor to the wall. Using the actuator to move the retention element from the expanded configuration to the retracted configuration with the wall anchor attached to the wall allows for the removal of the wall anchor from the wall aperture to detach the wall anchor from the wall.

9 Claims, 6 Drawing Sheets

U.S. PATENT DOCUMENTS

| | | |
|---|---|---|
| 6,435,789 B2 | 8/2002 | Gaudron |
| 6,746,191 B2 * | 6/2004 | Edland .......................... 411/34 |
| 6,884,012 B2 | 4/2005 | Panasik |
| 6,969,220 B2 * | 11/2005 | Anquetin ....................... 411/38 |
| 7,226,261 B1 | 6/2007 | Bristol |
| 2002/0100244 A1 | 8/2002 | Carroll |
| 2004/0109741 A1 | 6/2004 | Bavaro |

* cited by examiner

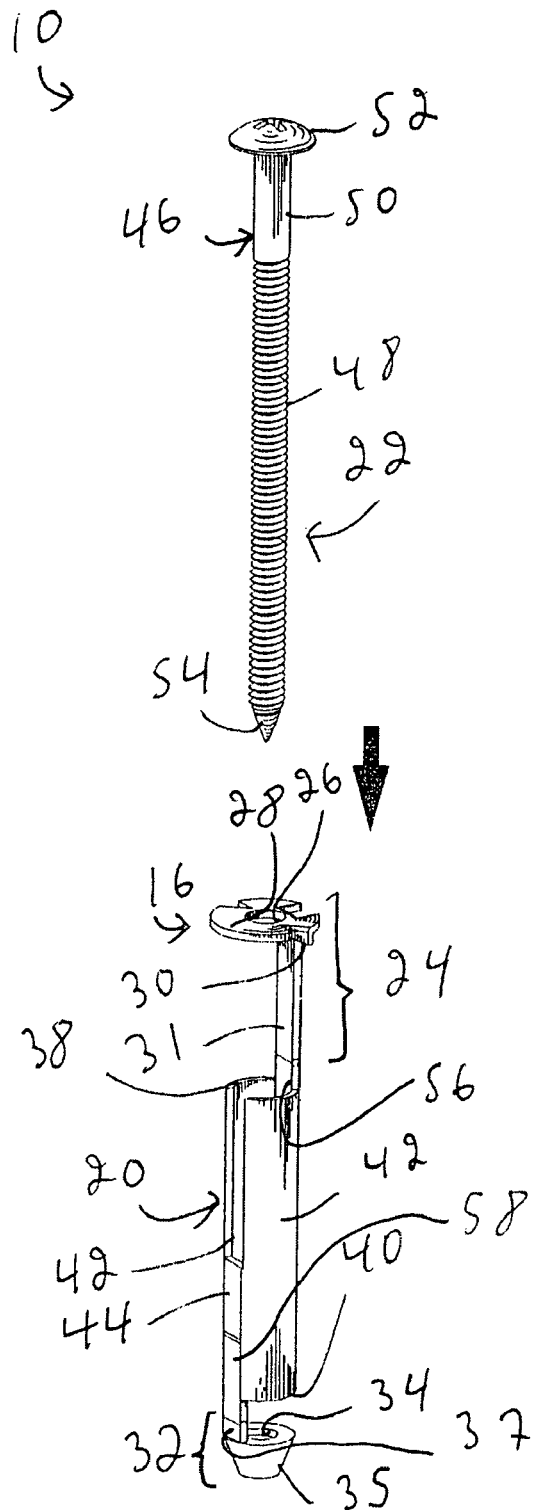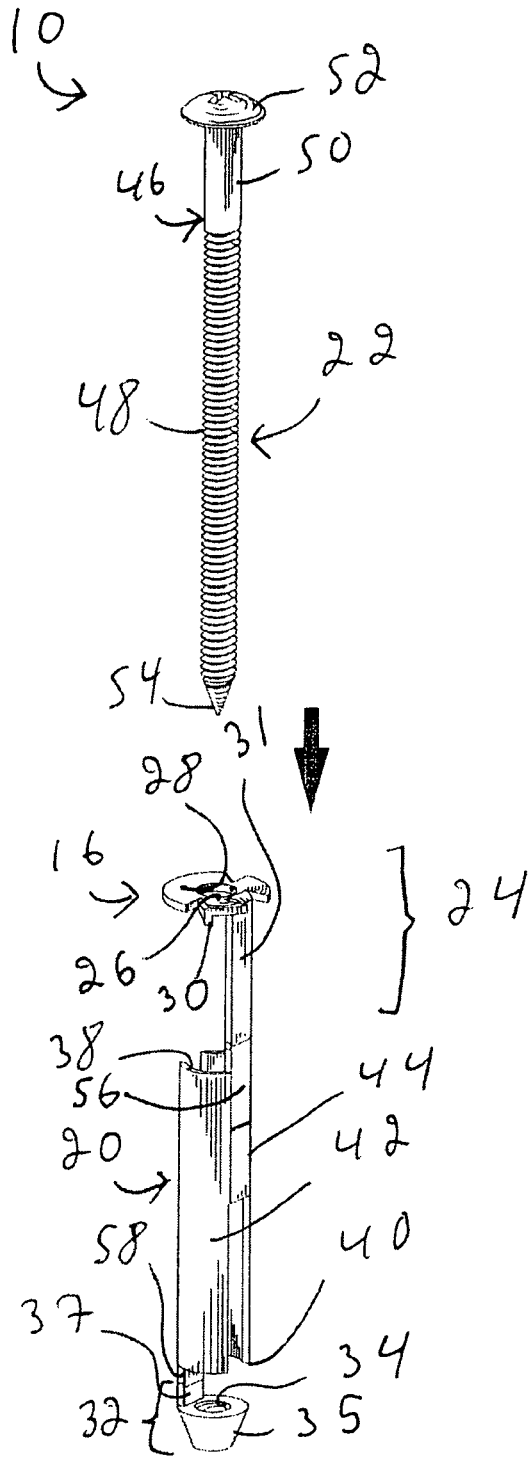
*Fig. 1*  *Fig. 2*

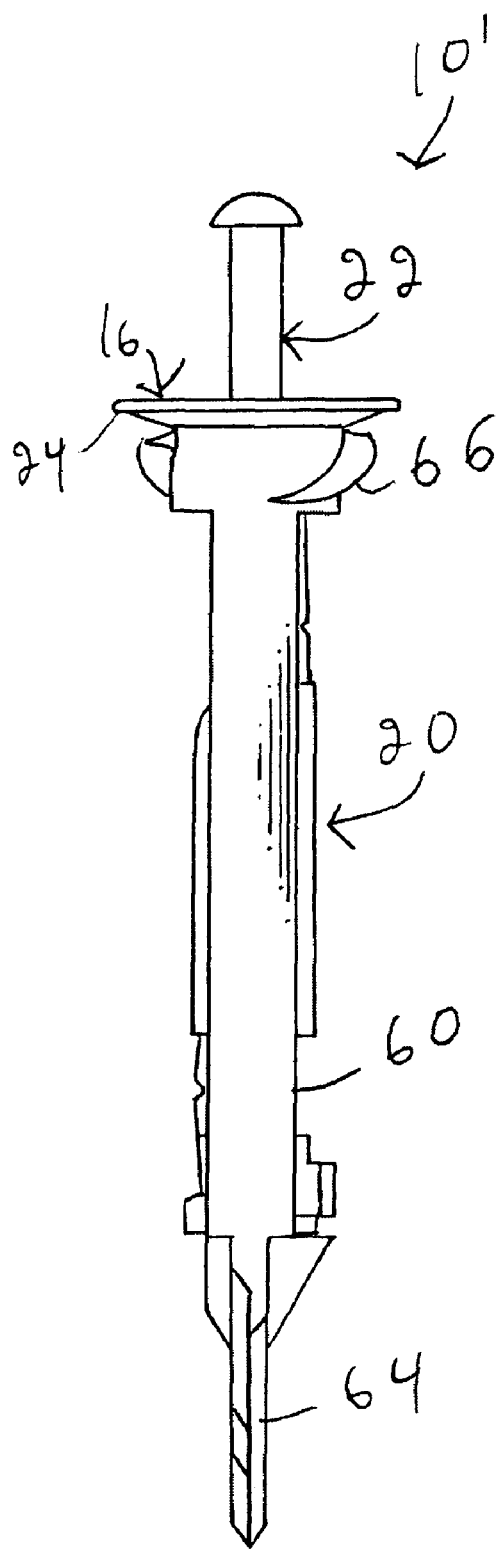
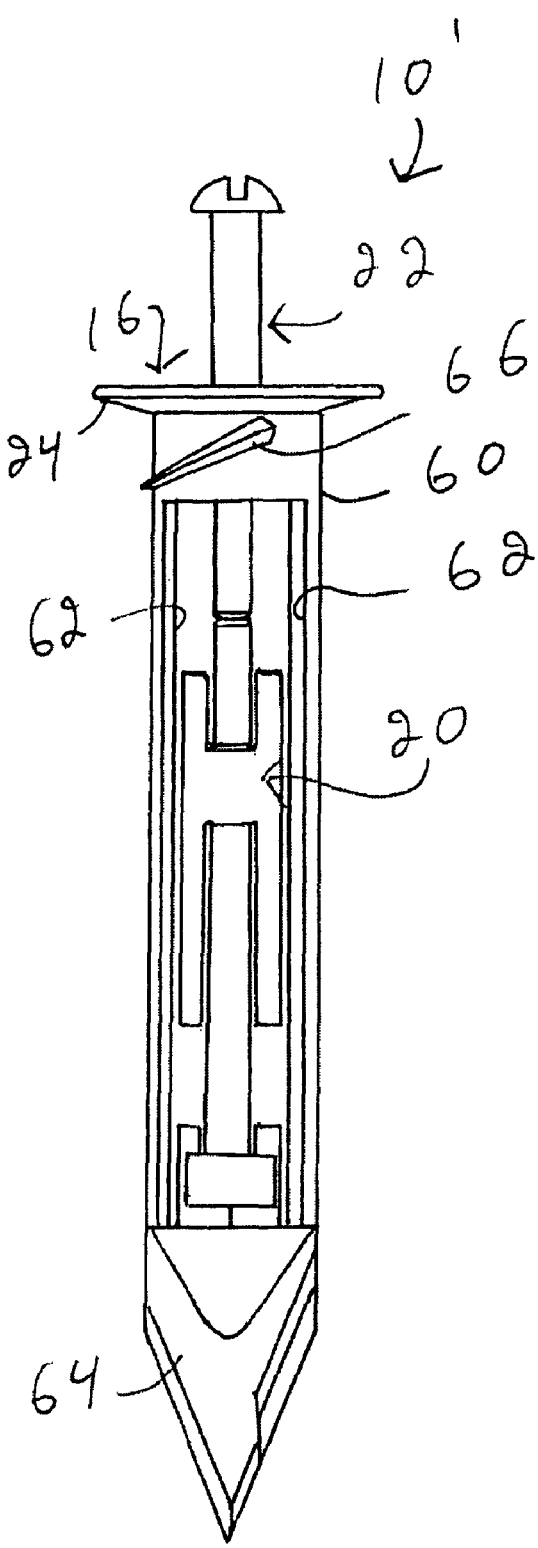
*Fig. 12*  *Fig. 13*

WALL ANCHOR

FIELD OF THE INVENTION

The present invention relates generally to the field of devices for attaching objects to a wall and, more particularly, to a wall anchor.

BACKGROUND

Wall anchors can be grouped together in two general types, namely the expanding anchor type, such as the plug and screw type or the expansion bolt type, and the deploying type such as the toggle bolt type.

Anchor of the expanding anchor type are normally easy and economical to manufacture. The plug and screw type is made up of only two elements: a plug and a screw. However, in usage, a predrilled hole much larger than the screw diameter has to be made. Then a plug is inserted in the hole and, finally, a screw is screwed in the plug, thereby expanding the plug and squeezing the exterior wall of the plug onto the surrounding wall of the hole. While plug and screw type anchors insure a fair grip between this anchor and walls formed of plasterboard, the dry wall material is far from creating the optimal holding force.

Similarly, the expansion bolt type is made of two parts: a bolt and a tube-like over sleeve. The over sleeve has a top section resting on the head of the bolt, while the bottom section has a thread section screwed onto the bottom part of the bolt. The middle section of the over sleeve is made up of bent out metal strips. While this type of anchors still relatively easy to manufacture, it is a little more expensive than the plug and screw type. However, these anchors present many drawbacks. First, most inexpensive models require a predrilled hole in which they are inserted. Also, in use, after being inserted in the hole, the bolt is screwed, thereby lifting up the bottom part of the over sleeve. The over sleeve squeezes against the bolt head causes the metal strips of the middle section to bend outwardly against the surrounding wall of the hole, thereby providing the holding grip. While the expansion bolt type insure a fair grip, it is also far from putting in the optimal holding force that can be archived otherwise.

Anchors of the deploying category, such as the toggle bolt type, include more parts and are more expensive to manufacture. These anchors have wings pivot means pivotally attached to the wing and onto a nut adapted to be screwed onto a bolt, along with a biasing means to deploy the wings. The wings are normally in a deployed configuration, but when the toggle bolt is pushed through a hole drilled in the hollow wall, the wings fold in against the bolt to allow passage therethrough. Generally, these anchors require a much larger hole diameter than the bolt diameter. On emerging from the hole, the pivoting wings resume their out-stretched state at a position well displaced from the inner surface of the wall. The user then turns the bolt to move the toggle wings axially toward the inner surface of the wall to tighten the toggle bolt. Aside from their high cost, the toggle bolt type provides the maximum holding force equivalent to the potential holding force that a wall sheeting can provide. However, they usually cannot be removed without losing the wings sections in between the hollow section of the wall.

Against this background, there exist a need for a new and improved wall anchor. It is a general object of the present invention to provide a new and improved wall anchor.

SUMMARY OF THE INVENTION

In a broad aspect, the invention provides a wall anchor attachable to a wall, the wall defining a wall aperture. The wall anchor includes a body; a retention element operatively coupled to the body so as to be reversibly movable between a retracted configuration and an expanded configuration, wherein, when the retention element is in the retracted configuration, the wall anchor is insertable into and removable from the wall aperture, and, when the retention element is in the expanded configuration and the body is operationally extending through the wall aperture, the retention element cooperates with the body to attach the wall anchor to the wall; and an actuator operatively coupled to the retention element for selectively moving the retention element between the expanded and retracted configurations. Inserting the wall anchor through the wall aperture with the retention element in the retracted configuration and subsequently using the actuator to move the retention element to the expanded configuration attaches the wall anchor to the wall. Using the actuator to move the retention element from the expanded configuration to the retracted configuration with the wall anchor attached to the wall allows for the removal of the wall anchor from the wall aperture to detach the wall anchor from the wall.

Advantageously, the proposed wall anchor is relatively easily removably attachable to a wall to allow easy removal of the wall anchor without damaging the wall. The wall anchor is attachable to and removable from the wall using a few ergonomic and quick steps.

Also, the proposed wall anchor is relatively easily manufacturable using known components and techniques. In some embodiments of the invention, a peripheral sleeve is provided around the proposed wall anchor and allows for piercing through the wall with this sleeve with minimal risks of damaging the wall anchor. To that effect, the sleeve typically defines a piercing section for piercing through the wall, the piercing section having a pointed configuration.

In some embodiments of the invention, the actuator includes a threaded fastener operable using a conventional screwdriver which, therefore, allows for attachment and detachment of the wall anchor to and from the wall without the use of specialized tools. Typically, the retention element is substantially elongated and pivotally coupled to the body so as to be substantially parallel to the body longitudinal axis in the retracted configuration and to be substantially perpendicular to the body longitudinal axis in the extended configuration. However, other variants are also within the scope of the present invention.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

FIG. 1, in an exploded perspective view, illustrates a wall anchor in accordance with an embodiment of the present invention;

FIG. 2, in an alternative perspective exploded view, illustrates the wall anchor shown in FIG. 1;

FIG. 12, in a side elevation view, illustrates a wall anchor in accordance with an alternative embodiment of the present invention; and FIG. 13, in a front elevation view, illustrates the wall anchor shown in FIG. 12.

DETAILED DESCRIPTION

Figure 11:
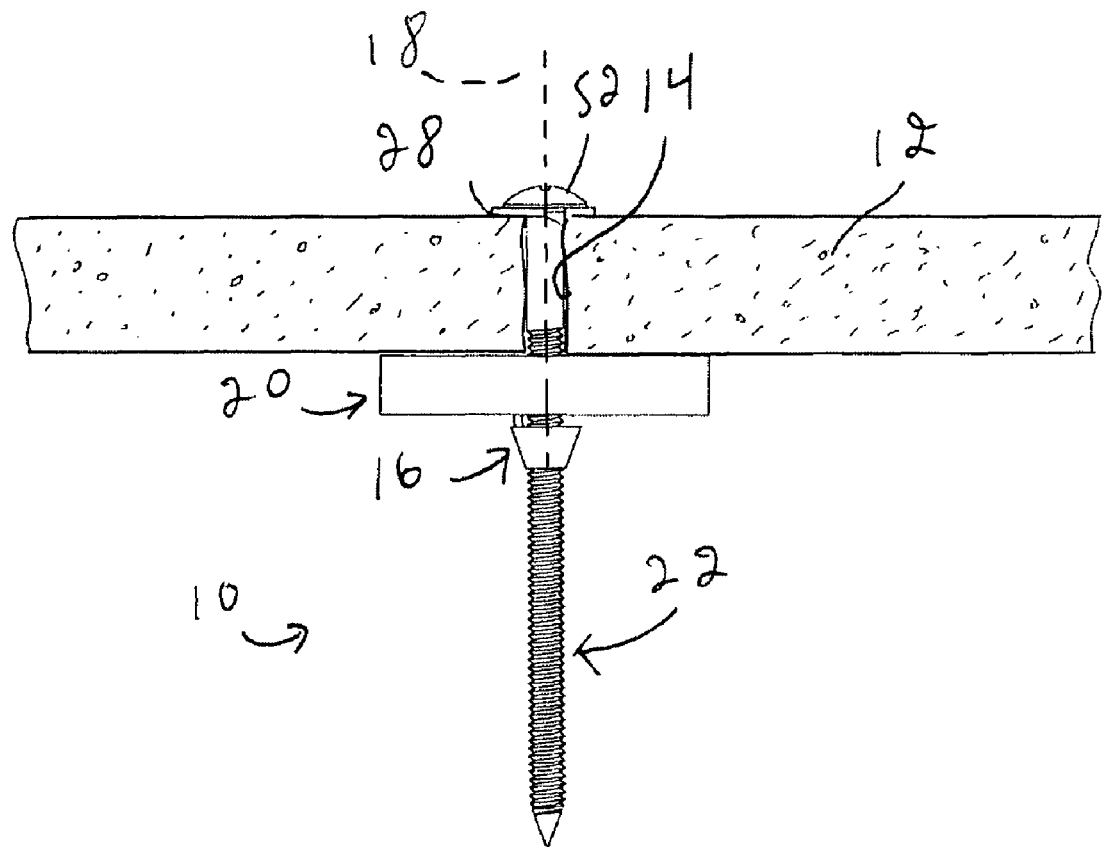
FIG. 11, in a side cross-sectional view, illustrates the wall anchor shown in FIGS. 1 to 10 attached to the wall shown in FIG. 10.

With reference to FIGS. 1 to 11, there is shown a wall anchor 10 in accordance with an embodiments of the present invention. As shown in FIG. 11, the wall anchor 10 is attachable to a wall 12 defining a wall aperture 14. The wall anchor 10 includes a body 16 defining a body longitudinal axis 18, a retention element 20 and an actuator 22.

Figure 3:
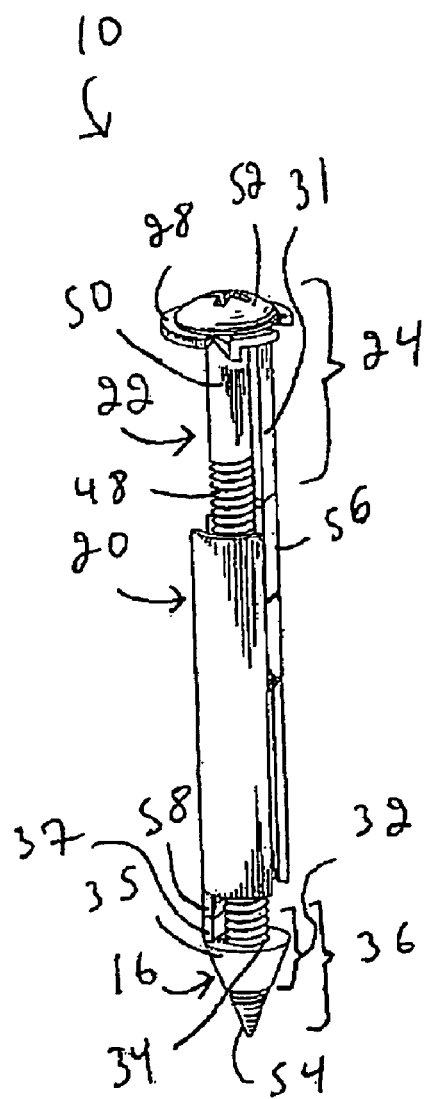
FIG. 3, in a perspective view, illustrates the wall anchor shown in FIGS. 1 and 2, the wall anchor being shown in a retracted configuration.
Figure 4:
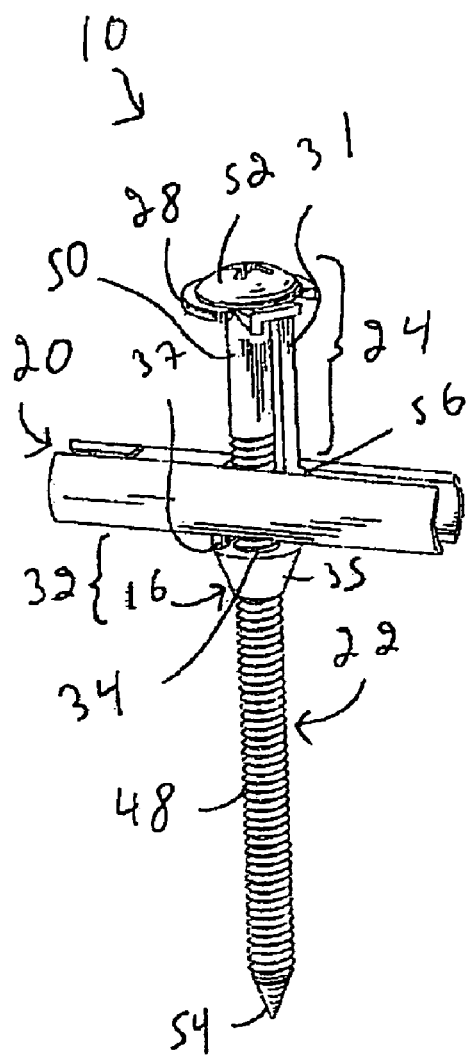
FIG. 4, in a perspective view, illustrates the wall anchor shown in FIGS. 1 to 3, the wall anchor being shown in an expanded configuration.

The retention element 20 is operatively coupled to the body 16 so as to be reversibly movable between a retracted configuration, shown for example in FIG. 3 and an expanded configuration, shown for example in FIG. 4. When the retention element 20 is in the retracted configuration, the wall anchor 10 is insertable into and removable from the wall aperture 14. When the retention element 20 is in the expanded configuration and the body 16 is operationally extending through the wall aperture 14, the retention element cooperates with the body 16 to attach the wall anchor 10 to the wall 12.

The actuator 22 is operatively coupled to the retention element 20 for selectively moving the retention element 20 between the expanded and retracted configurations. Therefore, inserting the wall anchor 10 through the wall aperture 14 with the retention element 10 in the retracted configuration and subsequently using the actuator 22 to move the retention element 20 to the expanded configuration attaches the wall anchor 10 to the wall 12. Conversely, using the actuator 22 to move the retention element 20 from the expanded configuration to the retracted configuration with the wall anchor 10 attached to the wall 12 allows for the removal of the wall anchor 10 from the wall aperture 14 to detach the wall anchor 10 from the wall 12.

Typically, the retention element 20 is substantially elongated and pivotally coupled to the body 16 so as to be substantially parallel to the body longitudinal axis 18 in the retracted configuration and to be angled, for example perpendicular, relatively to the body longitudinal axis 18 in the expanded configuration.

Referring to FIGS. 1 and 2, the body 16 defines a body proximal portion 24 and a substantially longitudinally opposed body distal portion 32. The body proximal and distal portions 24 and 32 are substantially longitudinally movable relatively to each other. The retention element 20 is pivotally coupled to the body proximal and distal portions 24 and 32 in a manner such that the body proximal and distal portions 24 and 32 are closer to each other when the retention element 20 is in the expanded configuration than when the retention element 20 is in the retracted configuration. Therefore, a relatively simple deformation of the body 16 allows for moving the retention element 20 between the expanded and retracted configurations.

Typically, the actuator 22 is operatively coupled to the body proximal and distal portions 24 and 32 so as to be able to move substantially longitudinally the body proximal and distal portions 24 and 32 relatively to each other to cause the movements of the retention element 20 between the retracted and expanded configurations.

The body proximal portion 24 defines a proximal portion aperture 26. Also, the body distal portion 32 defines a distal portion aperture 34, the body distal portion aperture 34 being threaded and extending substantially longitudinally through the body distal portion 32. The proximal and distal portion apertures 26 and 34 are substantially co-axial with each other. The body proximal portion 24 also defines a flange 28 delimiting the proximal portion aperture 26. In some embodiments of the invention, the body proximal portion 24 defines at least one rotation preventing protrusion 30 for engaging the wall 12 substantially adjacent to the wall aperture 14 and substantially preventing the wall anchor 10 from rotating about the body longitudinal axis 18 relatively to the wall aperture 14. For example, the rotation preventing protrusion extends from the flange 28 substantially adjacent the periphery thereof towards the body distal portion 32.

Typically, the flange 28 is substantially disc-shaped and the body proximal portion 24 also includes a proximal spacing segment 31 extending substantially longitudinally from the flange 28, for example substantially adjacent to the periphery thereof.

Also, the body distal portion 32 typically includes a substantially frusto-conical portion 35 tapering in a direction leading substantially away from the flange 28 and a distal spacing segment 37 extending substantially longitudinally from the frusto-conical portion 35 towards the flange 28. The proximal and distal spacing segments 31 and 37 are typically substantially diametrically opposed relatively to each other in the body 16. Also, the distal portion aperture 34 extends substantially axially through the frusto-conical portion 35.

The retention element 20 is typically substantially elongated and defines substantially longitudinally opposed retention element proximal and distal ends 38 and 40. The retention element proximal and distal ends 38 and 40 each protrude substantially radially away from the body 16 when the retention element 20 is in the expanded configuration. This configuration of the retention element 20 allows for manufacturing a relatively robust and strong wall anchor 10 using a relatively small amount of relatively lightweight materials. Indeed, in opposition to many common wall anchors that include deployable wings, the entire structure of the wall anchor 10 is used to attach the wall anchor 10 to the wall 12, which creates the above-mentioned advantages.

In the embodiment of the invention shown in the drawings, the retention element 20 consists in a pair of substantially cylindrical shells 42 each extending along an arc segment of a cylinder and a pair of interconnecting elements 44 extending between the cylindrical shells 42. The interconnecting elements 44 are substantially diametrically opposed to each other and substantially longitudinally offset relatively to the mid-point of the cylindrical shells 42.

In some embodiments of the invention, the actuator 22 includes a threaded fastener 46 operatively coupled to the body proximal and distal portions 24 and 32 so as to be able to vary a longitudinal distance between the body proximal and distal portions 24 and 32. The threaded fastener 46 is, for example, a conventional screw or bolt.

Figures 8, 9:
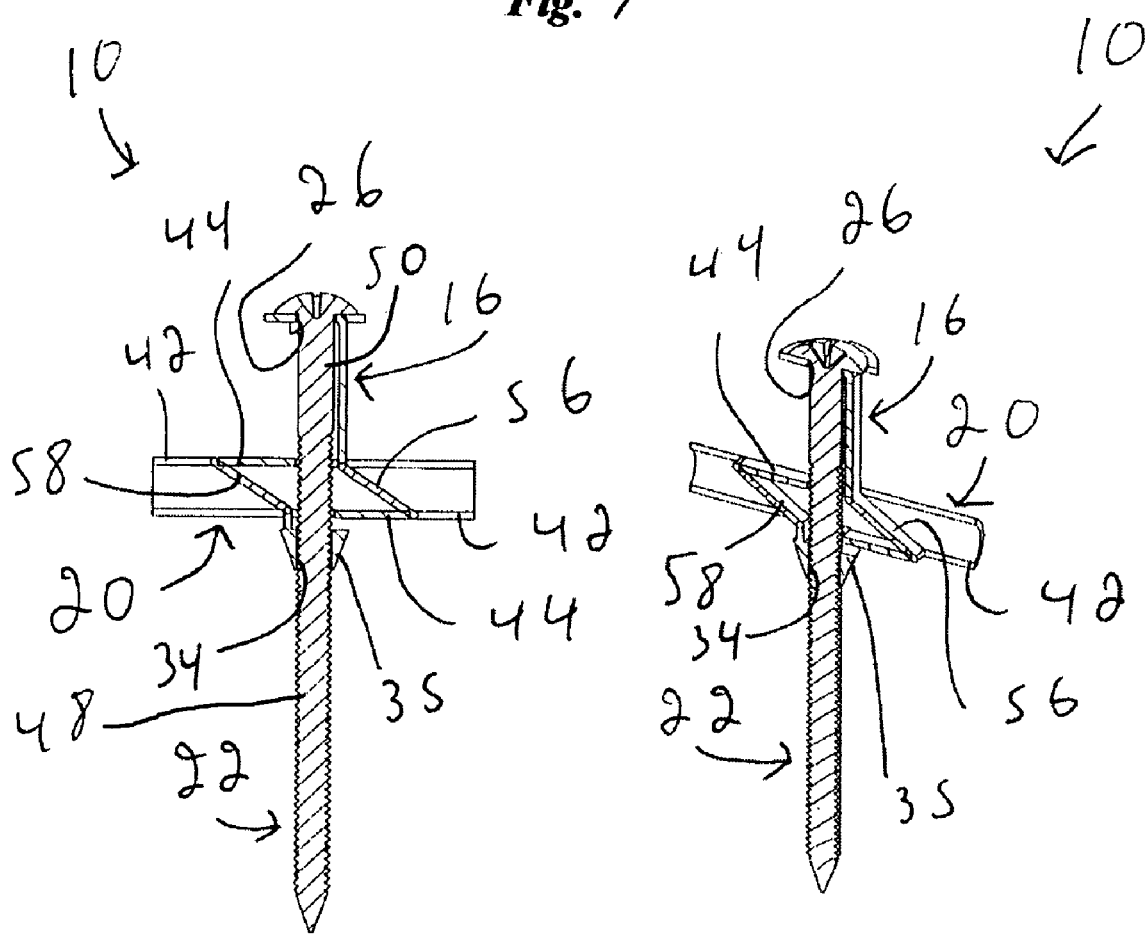
FIG. 8, in a side cross-sectional view along the line 8-8 of FIG. 7, illustrates the wall anchor shown in FIGS. 1 to 7.
FIG. 9, in a perspective cross-sectional view, illustrates the wall anchor shown in FIGS. 1 to 8.
Figure 10:
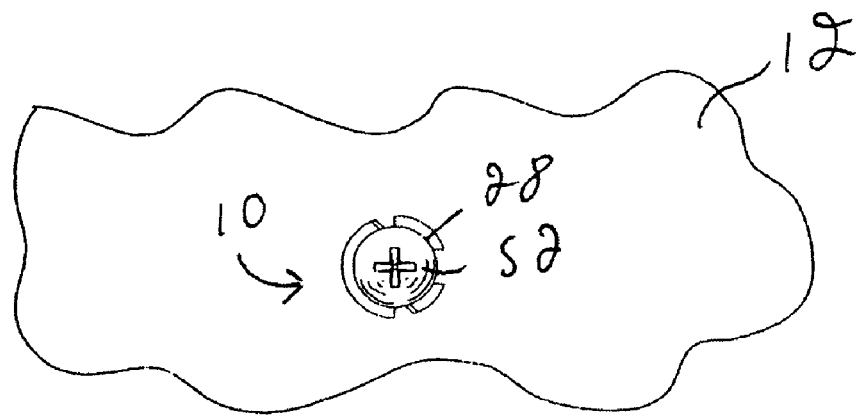
FIG. 10, in a top elevation view, illustrates the wall anchor shown in FIGS. 1 to 9 attached to a wall.

The threaded fastener 46 defines a threaded rod 48 and an unthreaded rod 50 extending substantially longitudinally from the threaded rod 48. A fastener head 52 extends substantially radially outwardly from the unthreaded rod 50, typically substantially adjacent the end thereof that is opposed to the threaded rod 48. Also, the threaded fastener 48 defines a pointed distal end 54 substantially opposed to the fastener head 52, the pointed distal end 54 typically having a substantially conical configuration. As seen in FIG. 8, the threaded rod 48 threadingly engages the distal portion aperture 34 and the unthreaded rod 50 extends through the proximal portion aperture 26 with the flange 28 located between the body distal portion 32 and the fastener head 52.

Returning to FIGS. 1 and 2, a coupling between the retention element 20 and the body 16 is performed in the embodiment of the invention shown in the drawings by a proximal linking element 56 extending between and pivotally coupled to both the body proximal portion 24 and the retention element 20 and a distal linking element 58 extending between and pivotally coupled to both the body distal portion 32 and the retention element 20. Typically, the proximal and distal linking elements 56 and 58 are hingedly attached to the body proximal and distal portions 24 and 32 and to the retention element 20.

For example, this attachment is provided by manufacturing the wall anchor 10 out of a polymer that moulded to have a suitable shape and defining a slit at the junction between the proximal and distal linking elements 56 and 58 and the components to which the proximal and distal linking elements 56 and 58 are attached. Typically, the proximal and distal linking elements 56 and 58 and respectively hingedly attached to proximal and distal spacing segments 31 and 37 and to a respective one of the interconnecting elements 44. Therefore, the proximal and distal linking elements are substantially diametrically opposed relatively to the body 16 and substantially longitudinally opposed relatively to the retention element 20.

As seen in FIG. 3, in some embodiments of the invention, the wall anchor 10 defines a distal piercing section 36. The piercing section 36 is usable to pierce through a wall 12, for example by hammering onto the wall anchor 10, or to expand a wall aperture 14 having a diameter smaller than the diameter of the wall anchor 10 by pressing onto or hammering onto the wall anchor 10. In the embodiment of the invention shown in the drawings, the wall anchor 10 defines a piercing section 36 having a substantially pointed configuration oriented in a direction leading substantially away from the body proximal portion 24 and is created by the frusto-conical portion 35 and the pointed distal end 54 protruding through the frusto-conical portion 35 through the distal portion aperture 34.

In use, the threaded fastener 46 is provided already attached to the body 16 or is provided detached from the body 16. In the latter case, the threaded fastener 46 is attached to the body 16 as follows. The threaded rod 48 is inserted through the proximal portion aperture 26 and through the gap created between the two cylindrical shells 42 to attain the distal portion aperture 34. Afterwards, the threaded rod 48 is threaded through the distal portion aperture 34 until the pointed distal end 54 protrudes from the distal portion aperture 34. Then, the wall anchor 10 is inserted through an already existing wall aperture 14, or hammered into a wall 12 to create the wall aperture 14, depending on the material used to manufacture the wall 12 and the wall anchor 10. Once the wall anchor 10 has been inserted through the wall aperture 14 until the flange 28 abuts against the wall 12 and the retention protrusions 30 engage the wall 12, the threaded fastener 46 is threaded through the distal portion aperture 34.

Figure 5:
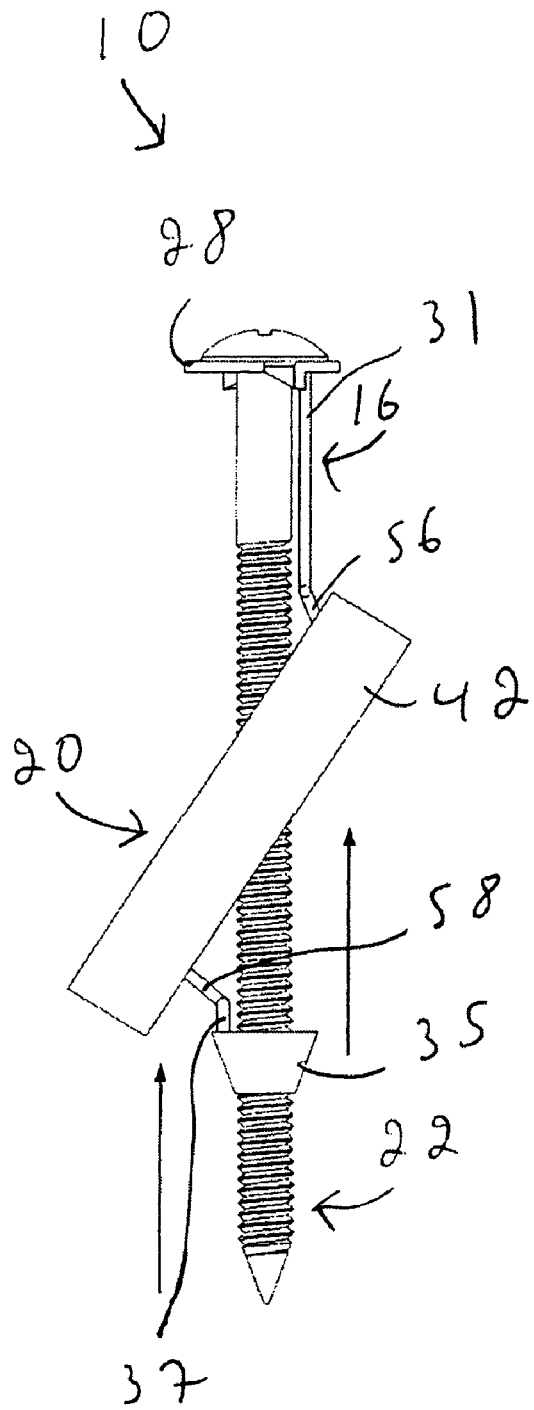
FIG. 5, in a side elevation view, illustrates the wall anchor shown in FIGS. 1 to 4, the wall anchor being shown in a configuration intermediate the expanded and retracted configurations.
Figure 6:
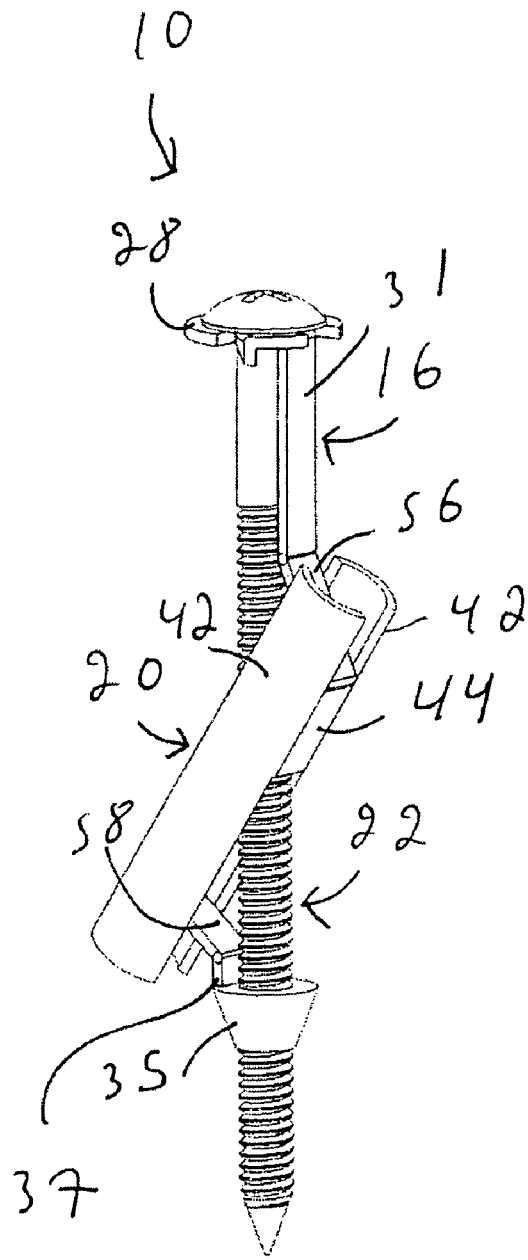
FIG. 6, in a perspective view, illustrates the wall anchor shown in FIGS. 1 to 5, the wall anchor being shown in a configuration intermediate the expanded and a retracted configurations.
Figure 7:
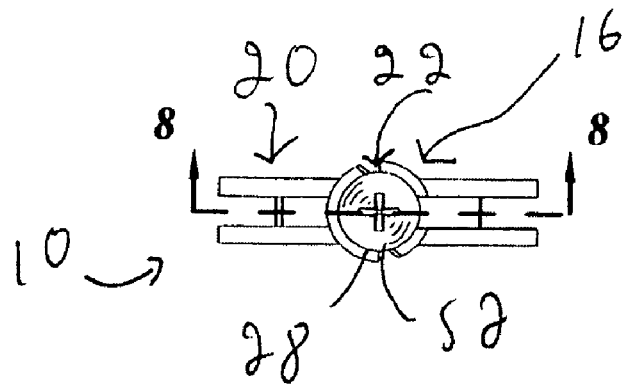
FIG. 7, in a top plan view, illustrates the wall anchor shown in FIGS. 1 to 6.

This causes the body proximal and distal portions 24 and 32 to be forced towards each other as the threaded fastener 46 is prevented from going through the body proximal portion 24 by the flange 28 when the fastener head abuts against the flange 28. In turn, as seen in FIGS. 5 and 6, this movement causes the proximal and distal linking elements 56 and 58 to pivot relatively to the body proximal and distal portions 24 and 32 and relatively to the retention element 20, which causes the retention element 20 to pivot to achieve the expanded configuration. In the expanded configuration, the wall 12 is typically pinched between the flange 28 and the retention element 20. If removal of the wall anchor 10 from the wall 12 is desired, these steps are reversed.

FIGS. 12 and 13 illustrate a wall anchor 10' in accordance with an alternative embodiment of the invention. To the above-mentioned elements, the wall anchor 10' adds a peripheral sleeve 60 extending substantially longitudinally from the body proximal portion 24. The peripheral sleeve 60 is substantially elongated and has a substantially cylindrical configuration. The peripheral sleeve 60 extends peripherally to the actuator 22 and to the retention element 20 with the retention element in the retracted configuration. The peripheral sleeve 60 defines a pair of substantially diametrically opposed slits 62 each extending substantially longitudinally. The slits 62 are provided for allowing movement of the retention element 20 through the peripheral sleeve 60 as the retention element 20 is moved between the retracted and expanded configurations. Therefore, the slits 62 are substantially in register with the retention element and the proximal and distal linking elements 56 and 58.

Typically, the peripheral sleeve 60 defines a distal piercing section 64 for piercing through the wall 12. The distal piercing section 64 has a substantially triangular and flat configuration. In some embodiments of the invention, the peripheral sleeve 60 defines threads 66 substantially adjacent the body proximal portion 24. The threads 66 and the distal piercing section 64 are conventional in wall anchors and will therefore not be described in further details. The peripheral sleeve 60 extends over a distance sufficient for receiving thereinto the threaded fastener 46 and the body distal portion 32.

Although the present invention has been described hereinabove by way of preferred embodiments thereof, it can be modified, without departing from the spirit and nature of the subject invention as defined in the appended claims.

What is claimed is:

1. A wall anchor attachable to a wall, said wall defining a wall aperture, said wall anchor being substantially elongated and comprising:
   a proximal body element and a substantially longitudinally opposed distal body element, said proximal and distal body elements being substantially longitudinally movable relatively to each other, said proximal body element defining a substantially radially extending flange for abutting against said wall when said proximal body element is inserted in said wall aperture;
   a substantially elongated retention element provided between said proximal and distal body elements and pivotally coupled to each of said proximal and distal body elements so as to be reversibly movable between a retracted configuration and an expanded configuration, wherein, in said retracted configuration, said retention element extends substantially longitudinally between said proximal and distal body elements, and, in said expanded configuration, said retention element extends substantially transversally between said proximal and distal body elements;

an actuator operatively coupled to said retention element for selectively moving said retention element between said expanded and retracted configurations;

a proximal linking element extending between and pivotally coupled to both said proximal body element and said retention element; and a distal linking element extending between and pivotally coupled to both said distal body element and said retention element;

wherein said actuator is operatively coupled to said proximal and distal body elements so as to be able to move substantially longitudinally proximal and distal body elements relatively to each other to cause movements of said retention element between said retracted and expanded configurations; and wherein said proximal and distal linking elements are substantially diametrically opposed with respect to each other.

2. A wall anchor as defined in claim 1, wherein said retention element defines a retention element proximal end and a substantially opposed retention element distal end, said retention element proximal and distal ends each protruding substantially radially outwardly when said retention element is in said expanded configuration.

3. A wall anchor as defined in claim 1, wherein said actuator includes a threaded fastener operatively coupled to said proximal and distal body elements so as to be able to vary a distance between said proximal and distal body elements.

4. A wall anchor as defined in claim 3, wherein said distal body elements defines a threaded distal element aperture extending substantially longitudinally therethrough and said proximal body element defines a proximal element aperture, said proximal and distal element apertures being substantially coaxial with each other, said flange delimiting said proximal element aperture;

said threaded fastener defines a threaded rod, an unthreaded rod extending substantially longitudinally from said threaded rod and a fastener head extending substantially radially outwardly from said unthreaded rod; and said threaded rod threadingly engages said distal element aperture and said unthreaded rod extends through said proximal element aperture with said flange located between said distal body element and said fastener head.

5. A wall anchor as defined in claim 1, wherein said proximal and distal linking elements are substantially longitudinally offset relatively to said retention element.

6. A wall anchor as defined in claim 1, wherein said wall anchor defines a piercing section having a substantially pointed configuration oriented in a direction leading substantially away from said proximal body element.

7. A wall anchor as defined in claim 1, wherein said proximal body element defines a rotation preventing protrusion for engaging said wall substantially adjacent to said wall aperture and substantially preventing said wall anchor from rotating about said body longitudinal axis relatively to said wall aperture.

8. A wall anchor attachable to a wall, said wall defining a wall aperture extending therethrough, said wall anchor being substantially elongated and comprising:

a proximal body element and a substantially longitudinally opposed distal body element, said proximal and distal body-elements being substantially longitudinally movable relatively to each other, said proximal body element defining a substantially radially extending flange for abutting against said wall when said proximal body element is inserted in said wall aperture;

a substantially elongated retention element provided between said proximal and distal body elements and pivotally coupled to each of said proximal and distal body elements so as to be reversibly movable between a retracted configuration and an expanded configuration, wherein, in said retracted configuration, said retention element extends substantially longitudinally between said proximal and distal body elements, and, in said expanded configuration, said retention element extends substantially transversally between said proximal and distal body elements;

an actuator operatively coupled to said retention element for selectively moving said retention element between said expanded and retracted configurations; and a peripheral sleeve extending substantially longitudinally from said proximal body element peripherally to said actuator and to said retention element with said retention element in said retracted configuration, said peripheral sleeve defining a pair of substantially diametrically opposed and longitudinally extending slits for allowing movements of said retention element through said peripheral sleeve as said retention element is moved between said retracted and expanded configurations.

9. A wall anchor as defined in claim 8, wherein said peripheral sleeve defines a distal piercing section for piercing through said wall.

* * * * *